US012686827B2

(12) United States Patent
Al-Aqeeli et al.

(10) Patent No.: US 12,686,827 B2
(45) Date of Patent: Jul. 21, 2026

(54) METHODS OF PROCESSING, TRANSPORTING, OR BOTH, OF HYDROGEN

(71) Applicant: Saudi Arabian Oil Company, Dhahran (SA)

(72) Inventors: Anas S. Al-Aqeeli, Dhahran (SA); Raed H. Abudawoud, Dhahran (SA); Faisal M. Almulla, Dhahran (SA); Guanghui Zhu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 220 days.

(21) Appl. No.: 18/543,274

(22) Filed: Dec. 18, 2023

(65) Prior Publication Data

US 2025/0197740 A1 Jun. 19, 2025

(51) Int. Cl.
C10G 61/04 (2006.01)
C01B 3/0015 (2026.01)
C10G 49/22 (2006.01)

(52) U.S. Cl.
CPC ............ C10G 61/04 (2013.01); C01B 3/0015 (2013.01); C10G 49/22 (2013.01); (Continued)

(58) Field of Classification Search
CPC .. C10G 61/04; C10G 49/22; C10G 2300/301; C10G 2300/4006; C10G 2300/4012; (Continued)

(56) References Cited

U.S. PATENT DOCUMENTS 3,835,037 A * 9/1974 Anthony ................ C10G 29/16
208/260
5,326,463 A * 7/1994 Fletcher ................. C10G 69/08
208/89

(Continued)

FOREIGN PATENT DOCUMENTS

EP 2960204 A1 12/2015
WO WO-9617040 A1 * 6/1996 ............. C10G 69/08
WO 2022074336 A1 4/2022

OTHER PUBLICATIONS

Notification of Transmittal of the International Search Report and the Written Opinion of the International Searching Authority, or the Declaration dated Mar. 19, 2025 pertaining to International application No. PCT/US2024/060452 filed Dec. 17, 2024, pp. 1-14.
Abdin, et al., "Large-scale stationary hydrogen storage via liquid organic hydrogen carriers", iScience, vol. 24, No. 102966, Sep. 24, 2021.

*Primary Examiner* — Michelle Stein
(74) *Attorney, Agent, or Firm* — Dinsmore & Shohl LLP

(57) ABSTRACT

A method for transporting hydrogen may comprise, at a first hydrocarbon processing facility, passing a heavy naphtha stream, a C9+ aromatic compounds-containing stream, and an input hydrogen-containing stream to a hydrotreater to form a hydrotreated effluent stream; passing the hydrotreated effluent stream to a separation unit to form a naphthenics-containing stream and a separation unit effluent stream; transporting the naphthenic stream to a second hydrocarbon processing facility; and at the second hydrocarbon processing facility, passing at least a portion of the naphthenic stream to a dehydrogenation unit to form a hydrogen product stream. The first hydrocarbon processing facility and the second hydrocarbon processing facility may be separated by a distance of at least 100 km. Further disclosed herein are methods of processing hydrogen which produce aromatic compounds, including C9+ aromatic compounds containing streams.

20 Claims, 3 Drawing Sheets

(52) U.S. Cl.
CPC ............................ *C01B 2203/0227* (2013.01);
*C01B 2203/065* (2013.01); *C10G 2300/301*
(2013.01); *C10G 2300/4006* (2013.01); *C10G*
*2300/4012* (2013.01); *C10G 2300/4018*
(2013.01); *C10G 2400/30* (2013.01)

(58) Field of Classification Search
CPC ........ C10G 2300/4018; C10G 2400/30; C10G
35/00; C10G 63/02; C10G 69/08; C10G
2300/4062; C10G 2300/42; C10G 45/44;
C01B 3/0015; C01B 2203/0227; C01B
2203/065; C01B 2203/0277; C01B
2203/1252; C01B 3/24
See application file for complete search history.

(56) References Cited

U.S. PATENT DOCUMENTS

| | | | | |
|---|---|---|---|---|
| 5,552,033 | A * | 9/1996 | Shih ........................ | C10G 59/02 |
| | | | | 208/65 |
| 2010/0160699 | A1* | 6/2010 | Frey ........................ | C07C 15/08 |
| | | | | 585/315 |
| 2011/0083997 | A1* | 4/2011 | Silva ...................... | C10G 45/00 |
| | | | | 208/66 |
| 2021/0147754 | A1* | 5/2021 | Koseoglu ............... | C10G 69/00 |
| 2021/0269724 | A1* | 9/2021 | Hodgkins .............. | C10G 45/44 |
| 2023/0367300 | A1 | 11/2023 | Kumar et al. | |
| 2024/0166501 | A1 | 5/2024 | Monguillon | |

* cited by examiner

METHODS OF PROCESSING, TRANSPORTING, OR BOTH, OF HYDROGEN

TECHNICAL FIELD

Embodiments of the present disclosure generally relate to hydrogen processing, and more specifically, to methods and systems utilized in the transportation of hydrogen.

BACKGROUND

Hydrogen is growing in importance as an environmentally friendly precursor chemical and fuel. Processes for the production and usage of hydrogen are relatively well developed. However, processes for the storage and transportation of hydrogen are still insufficient to meet the needs of the hydrogen industry. Generally, hydrogen is stored and transported in the form of compressed gaseous hydrogen molecules (e.g., at above 5,000 pounds per square inch). However, these conventional gaseous hydrogen transportation techniques are costly and inefficient. For example, the compression process consumes a large amount of energy (estimated to be 30% or more of the energy content of the hydrogen). Also, transport and storage of the compressed hydrogen requires expensive pressure vessels. Some of the hydrogen molecules can even escape through the walls of hydrogen containment vessels. The hydrogen can also cause embrittlement of the storage and transport vessels. Overall, better methods of hydrogen storage and transport are needed.

BRIEF SUMMARY

Embodiments of the present disclosure provide, according to one or more embodiments, methods of processing and/or transporting hydrogen that may utilize existing refinery equipment, such as hydrotreaters and/or catalytic reformers. By the methods described herein, C9+ aromatic compounds may be utilized as liquid organic hydrogen carriers ("LOHCs"), where they may be charged with hydrogen in a hydrotreater at a first hydrocarbon processing facility by saturation of the aromatic moieties. These hydrogenated C9+ compounds may be transported in a naphthenic stream to a second hydrocarbon processing facility, where hydrogen gas may be produced by dehydrogenation in a catalytic reformer. Generally, this naphthenic stream is a liquid, or is easier to liquefy than hydrogen, and thus easier to transport than hydrogen gas. Thus, hydrogen may be transported over vast distances, such as between countries or continents, without the need for new process equipment or costly hydrogen gas pressurization. Moreover, in some embodiments, the C9+ aromatics that are utilized as LOHCs may be produced at the first hydrocarbon processing facility, which may be a refinery, by processing of crude oil and subsequent separation of C9+ aromatics in an aromatics complex.

According to one or more embodiments, a method for transporting hydrogen may comprise, at a first hydrocarbon processing facility: passing a heavy naphtha stream, a C9+ aromatic compounds-containing stream, and an input hydrogen-containing stream to a hydrotreater to form a hydrotreated effluent stream, and passing the hydrotreated effluent stream to a separation unit to form a naphthenics-containing stream and a separation unit effluent stream. The method may further comprise transporting the naphthenic stream to a second hydrocarbon processing facility, and at the second hydrocarbon processing facility, passing at least a portion of the naphthenic stream to a dehydrogenation unit to form a dehydrogenated hydrocarbon stream and a hydrogen product stream. The heavy naphtha stream may have an initial boiling point of from 80° C. to 100° C. and a final boiling point of from 180° C. to 220° C. The hydrotreated effluent stream may comprise hydrotreated naphtha and one or more saturated cyclic C9+ compounds. The naphthenics-containing stream may comprise at least 50 wt. % saturated cyclic C9+ compounds. The separation unit effluent stream may comprise at least 50 wt. % of hydrotreated naphtha. The first hydrocarbon processing facility and the second hydrocarbon processing facility may be separated by a distance of at least 100 km.

According to one or more embodiments, a method for processing hydrogen may comprise: passing a heavy naphtha stream, a C9+ aromatic compounds containing stream, and an input hydrogen-containing stream to a hydrotreater to form a hydrotreated effluent stream, passing the hydrotreated effluent stream to a separator to form a naphthenic stream and a separation unit effluent stream; passing the separation unit effluent stream to a catalytic reformer to form a reformate stream; passing the reformate stream to an aromatics separation unit to form an aromatics containing stream and a non-aromatics containing stream; passing the aromatics containing stream to an aromatics complex to form the C9+ aromatic compounds containing stream; and recycling the C9+ aromatic compounds containing stream to the hydrotreater. The heavy naphtha stream may have an initial boiling point of from 80° C. to 100° C. and a final boiling point of from 180° C. to 220° C. The hydrotreated effluent stream may comprise hydrotreated naphtha and one or more saturated cyclic C9+ compounds. The naphthenic stream may comprise at least 50 wt. % saturated cyclic C9+ compounds. The separation unit effluent stream may comprise at least 50 wt. % of hydrotreated naphtha. The aromatics containing stream may comprise at least 50 wt. % of aromatic compounds and the non-aromatics containing stream may comprise at least 50 wt. % of non-aromatic compounds.

These and other embodiments are described in more detail in the Detailed Description. It is to be understood that both the foregoing general description and the following detailed description present embodiments of the presently disclosed technology, and are intended to provide an overview or framework for understanding the nature and character of the technology as it is claimed. The accompanying drawings are included to provide a further understanding of the presently disclosed technology and are incorporated into and constitute a part of this specification. The drawings illustrate various embodiments and, together with the description, serve to explain the principles and operations of the presently disclosed technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
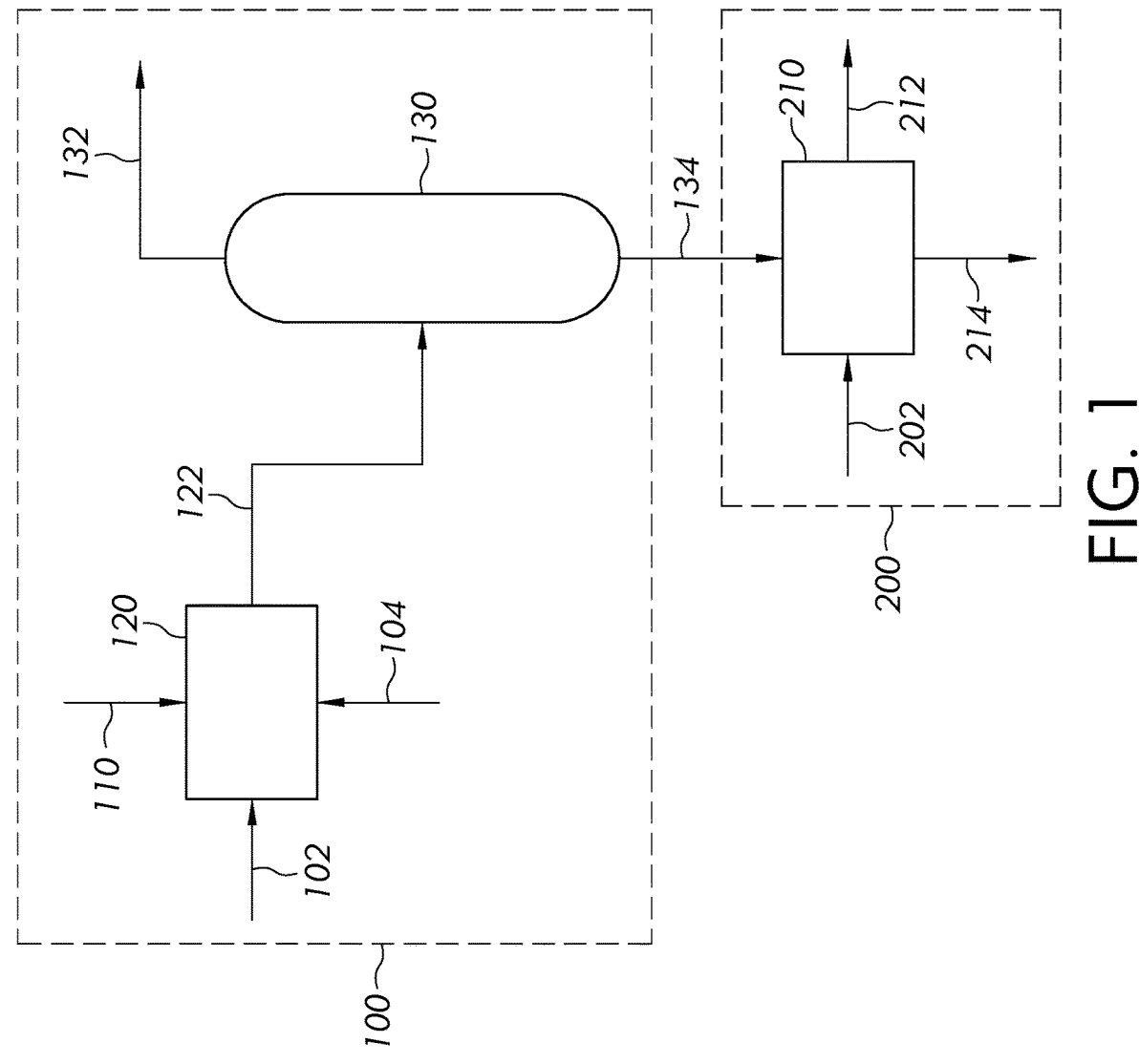
FIG. 1 schematically depicts a diagram of a system for transporting hydrogen, according to one or more embodiments described in this disclosure.

For the purpose of describing the simplified schematic illustrations and descriptions of the relevant figures, the numerous valves, temperature sensors, electronic controllers and the like that may be employed and well known to those of ordinary skill in the art of certain chemical processing operations are not included. Further, accompanying components that are often included in typical chemical processing operations, such as air supplies, catalyst hoppers, and flue gas handling systems, are not depicted. However, operational components, such as those described in the present disclosure, may be added to the embodiments described in this disclosure.

It should further be noted that arrows in the drawings refer to process streams. However, the arrows may equivalently refer to transfer lines which may serve to transfer process streams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component. It should be understood that arrows in the relevant figures are not indicative of necessary or essential steps.

It should be understood that according to the embodiments presented in the relevant figures, an arrow between two system components may signify that the stream is not processed between the two system components. In other embodiments, the stream signified by the arrow may have substantially the same composition throughout its transport between the two system components. Additionally, it should be understood that in one or more embodiments, an arrow may represent that at least 75 wt. %, at least 90 wt. %, at least 95 wt. %, at least 99 wt. %, at least 99.9 wt. %, or even 100 wt. % of the stream is transported between the system components. As such, in some embodiments, less than all of the streams signified by an arrow may be transported between the system components, such as if a slip stream is present.

It should be understood that two or more process streams are "mixed" or "combined" when two or more lines intersect in the schematic flow diagrams of the relevant figures. Mixing or combining may also include mixing by directly introducing both streams into a like reactor, separation device, or other system component. For example, it should be understood that when two streams are depicted as being combined directly prior to entering a separation unit or reactor, that in some embodiments the streams could equivalently be introduced into the separation unit or reactor and be mixed in the reactor.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 2:
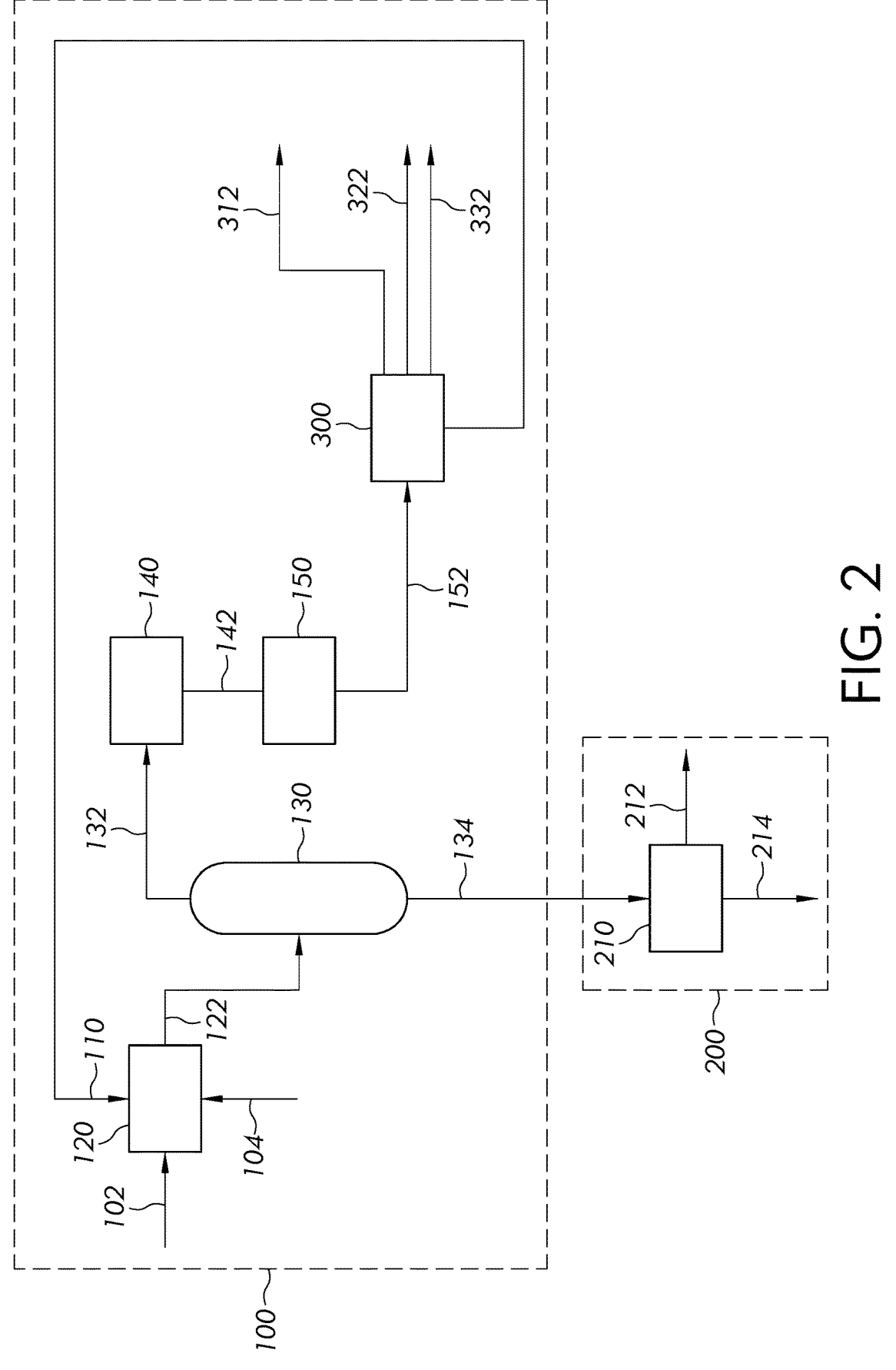
FIG. 2 schematically depicts a diagram of another system for transporting hydrogen, according to one or more embodiments described in this disclosure.
Figure 3:
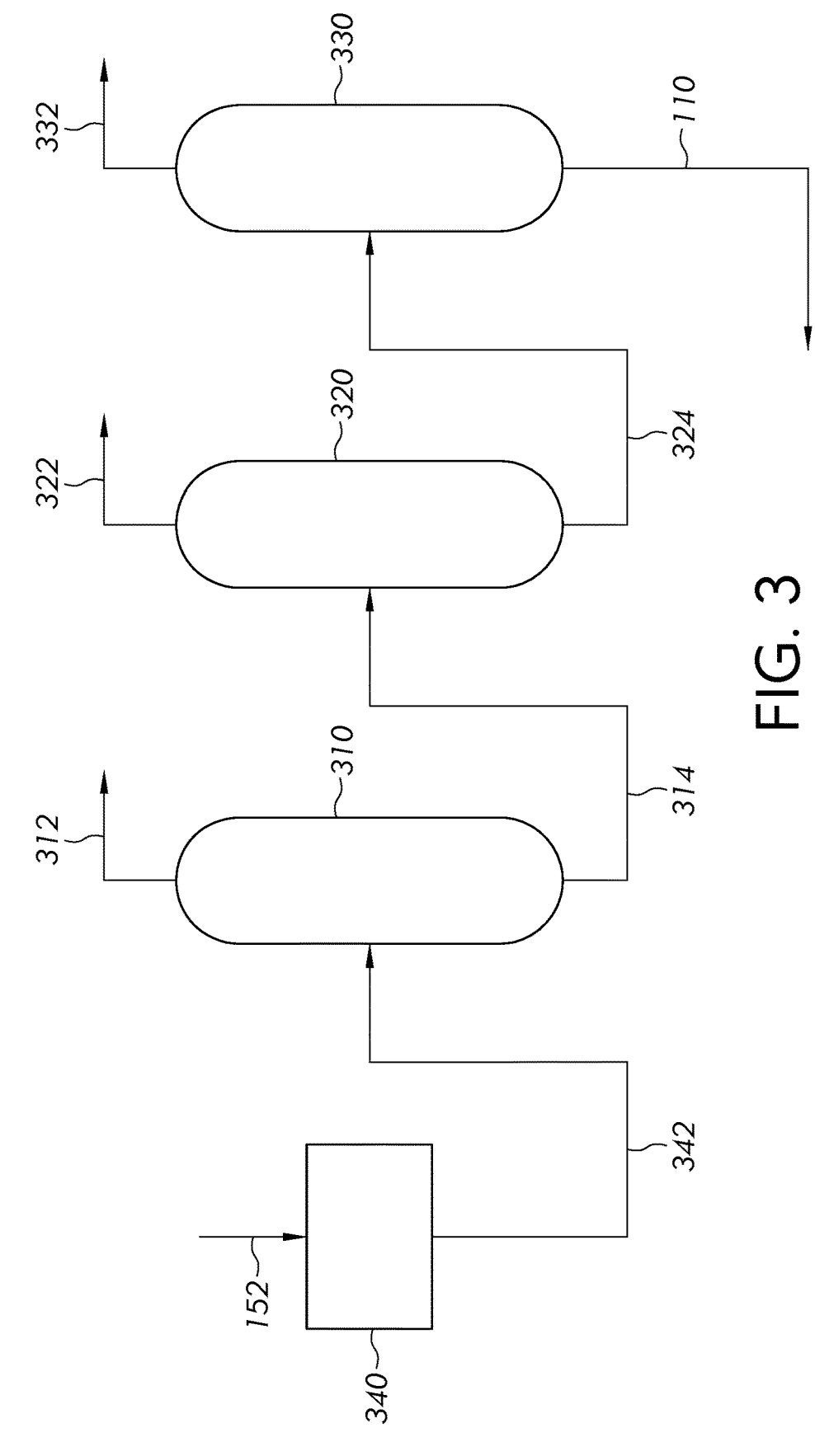
FIG. 3 schematically depicts a diagram of yet another system for transporting hydrogen, according to one or more embodiments described in this disclosure.

One or more embodiments of the present disclosure relate to methods for transporting hydrogen gas from one geographic region to another, or processing hydrogen such that it may be transported from one geographic region to another. In general, these methods are described herein in the context of one or more systems, shown in the drawings. The embodiments of FIGS. 1-3 are similar or identical in many ways, respectively, but include differences as described herein. Description of the embodiments of FIGS. 1-3 may generally apply to the embodiments of the other figures, as would be understood by those skilled in the art. For example, concepts disclosed herein applicable to FIG. 1 may be equally applicable to FIG. 2, and vice versa, even if not explicitly stated as such herein.

As described herein, a "hydrotreater" generally refers to a unit that may be within a refinery and designed to perform the hydrotreating process on a hydrocarbon feed. The hydrotreating process generally refers to the process of contacting a hydrocarbon feed with hydrogen and a hydrotreating catalyst at elevated temperature to remove or convert at least a portion of one or more impurities, such as sulfur, nitrogen, metals, and/or olefins. As described herein, a "naphtha hydrotreater" generally refers to a unit within a refinery designed to perform the hydrotreating process on naphtha fractions, such as heavy naphtha.

As described in this disclosure, a "catalyst" refers to any substance which increases the rate of a specific chemical reaction. Catalysts described in this disclosure may be utilized to promote various reactions, such as, but not limited to, hydrotreating reactions. As used in this disclosure, a "hydrotreating catalyst" increases the rate of a hydrotreating reaction, which may reduce sulfur, nitrogen, metals, or other substances in a process stream. Such catalysts may have dual functionality in some embodiments. The methods described herein should not necessarily be limited by specific catalytic materials. As described herein, the catalysts may be fixed in configuration and utilize gaseous reactants. However, other configurations are contemplated.

As used in this disclosure, a "separation unit" refers to any separation device or system of separation devices that at least partially separates one or more chemicals that are mixed in a process stream from one another. For example, a separation unit may selectively separate differing chemical species, phases, or sized material from one another, forming one or more chemical fractions. Examples of separation units include, without limitation, distillation columns, flash drums, knock-out drums, knock-out pots, centrifuges, cyclones, filtration devices, traps, scrubbers, expansion devices, membranes, solvent extraction devices, and the like. It should be understood that separation processes described in this disclosure may not completely separate all of one chemical constituent from all of another chemical constituent. It should be understood that the separation processes described in this disclosure "at least partially" separate different chemical components from one another, and that even if not explicitly stated, it should be understood that separation may include only partial separation.

Now referring to FIG. 1, a hydrogen transport system 101 is depicted. The hydrogen transport system 101 may include at least a first hydrocarbon processing facility 100 and a second hydrocarbon processing facility 200, where the first hydrocarbon processing facility 100 and a second hydrocarbon processing facility 200 may be different geographic locations, such as separated by a distance of at least 100 km, as described herein. In general, a single hydrocarbon processing facility, such as the first hydrocarbon processing facility 100 and a second hydrocarbon processing facility 200, may be a processing facility that is only locally integrated with other processing facilities, and generally refers to an integrated complex capable of transforming its respective hydrocarbon feedstock into its respective products. For example, a single hydrocarbon processing facility may be under the control of a single entity, such as a company. In embodiments, each of the first hydrocarbon processing facility 100 and the second hydrocarbon processing facility 200 may independently be oil refineries. For example, the first hydrocarbon processing facility 100 and a second hydrocarbon processing facility 200 may be oil refineries, respectively, that are in different geographic regions, such as different states, countries, counties, provinces, continents, etc. Such oil refineries may process crude oil, or in other embodiments, may not presently process crude oil but may have been designed and/or built to process crude oil. In particular, and as described herein, the first hydrocarbon processing facility 100 and the second hydrocarbon processing facility 200 may each be oil refineries that include hydrotreaters and catalytic reformers, such as may be utilized to process heavy naphtha cuts of crude oil in a refinery.

The first hydrocarbon processing facility 100 and the second hydrocarbon processing facility 200 may be separate from one another and in different geographic regions. For example, the first hydrocarbon processing facility 100 and the second hydrocarbon processing facility 200 may be at least 100 km apart from one another, such as at least 200 km apart from one another, at least 500 km apart from one another, or at least 1000 km apart from one another.

The physical distance between the first hydrocarbon processing facility 100 and the second hydrocarbon processing facility 200 may make conventional transportation of hydrogen gas between the first hydrocarbon processing facility 100 and the second hydrocarbon processing facility 200 difficult and/or costly. Use of the present methods and systems may allow for cheaper and/or more efficient transport of hydrogen between the first hydrocarbon processing facility 100 and the second hydrocarbon processing facility 200, thereby allowing an operator to take advantage of cheaper and/or renewable sources of electricity available near the first hydrocarbon processing facility 100 to form hydrogen gas. In some embodiments, the first hydrocarbon processing facility 100 and the second hydrocarbon processing facility 200 may be located at different latitudes, which may allow the operator to take advantage of variations in energy production, such as the increased production of electricity of a given solar panel when placed closer to the equator or change in seasonality.

Still referring to FIG. 1, the first hydrocarbon processing facility 100 may comprise at least a hydrotreater 120 and a separation unit 130. These system components and their various arrangements will be described in detail herein.

According to one or more embodiments, at the first hydrocarbon processing facility 100, heavy naphtha stream 102, input hydrogen-containing stream 104, and C9+ aromatic compounds-containing stream 110 may be utilized in hydrogen transport system 101 and passed to hydrotreater 120. The heavy naphtha stream 102, input hydrogen-containing stream 104, and C9+ aromatic compounds containing stream 110 may be combined before being passed to hydrotreater 120 or may be combined therein.

According to one or more embodiments, the heavy naphtha stream 102 may comprise a hydrocarbon cut, such as a cut of a crude oil. The heavy naphtha stream 102 may have an initial boiling point (IBP) of from 80° C. to 100° C., such as from 85° C. to 90° C., from 90° C. to 95° C., from 95° C. to 100° C., from 88° C. to 92° C., or any combination of these ranges. The heavy naphtha stream 102 may have a final boiling point (FBP) of from 180° C. to 220° C., such as from 190° C. to 220° C., from 200° C. to 220° C., from 210° C. to 220° C., from 195° C. to 205° C., or any combination of these ranges According to one or more embodiments, the C9+ aromatic compounds containing stream 110 may comprise C9+ aromatic compounds (i.e., aromatic compounds having at least 9 carbon atoms). The aromatic compounds of the C9+ aromatic compounds containing stream 110 may be hydrocarbons. Suitable C9+ aromatic compounds may include, without limitation, benzyl toluene, dibenzyl toluene, methylindole, dimethylindole, phenazine, naphthalene, methylbenzyl pyridine, propylbenzene, methyl ethylbenzene, trimethylbenzene, butylbenzene, dimethyl ethylbenzene, and ethylcarbazole. For example, the C9+ aromatics may include two aromatic moieties linked to each other with an alkane bridge In embodiments, the C9+ aromatic compounds containing stream 110 may comprise at least 50 wt. %, such as at least 60 wt. %, at least 70 wt. %, at least 80 wt. %, at least 90 wt. %, at least 95 wt. %, at least 99 wt. %, or even at least 99.9 wt. % of the C9+ aromatic compounds, on the basis of the total weight of C9+ aromatic compounds containing stream 110.

According to one or more embodiments, the input hydrogen-containing stream 104 may comprise hydrogen gas. In embodiments, the input hydrogen-containing stream 104 may comprise at least 80 wt. %, at least 90 wt. %, at least 95 wt. %, at least 99 wt. %, or at least 99.9 wt. % of hydrogen gas, on the basis of the total weight of input hydrogen-containing stream 104.

According to one or more embodiments, a ratio of the flowrate of heavy naphtha stream to the flowrate of C9+ aromatic compounds-containing stream 110 into the hydrotreater 120 may be from 0.5 to 20, such as from 0.5 to 1, from 1 to 2, from 2 to 4, from 4 to 8, from 8 to 12, from 12 to 16, from 16 to 20, or any combination of one or more of these ranges.

According to one or more embodiments, the heavy naphtha stream 102 may be hydrotreated in the hydrotreater 120. The hydrotreater 120 may be a naphtha hydrotreater, such as a naphtha hydrotreater in an oil refinery. The hydrotreater 120 may be operable to at least partially reduce the content of metals, sulfur, and/or nitrogen in the heavy naphtha stream 102. Simultaneously, the C9+ aromatic compounds containing stream 110 may be passed to the hydrotreater. Additionally, in the hydrotreater, at least a portion of the C9+ aromatic compounds may be hydrogenated, where the aromatic moieties are converted to cyclo-hexane moieties. For example, the C9+ aromatic compounds may be saturated in the hydrotreater 120. It is contemplated that the hydrogenation of the C9+ aromatic compounds may be by thermal hydrogenation, at the temperatures experienced in the hydrotreater 120, or the reaction may be catalytically enhanced by hydrotreating catalyst or other catalyst specifically suited for hydrogenation. It is contemplated that the hydrogenation of the C9+ aromatics may take place at the same conditions as is normally utilized for heavy naphtha hydrotreating.

The hydrotreater 120 may include a hydrotreating catalyst, where the hydrocarbons and other chemicals present in the hydrotreater 120 may be contacted with a hydrotreating catalyst in the presence of hydrogen. Contemplated hydrotreating catalysts include cobalt-molybdenum (Co—Mo), nickel-molybdenum (Ni—Mo), nickel-tungsten (Ni—W), and/or noble metal catalysts. In embodiments, the catalyst may be supported by alumina, amorphous aluminosilicates, and zeolites. The hydrotreater 120 may be operated at a reaction temperature from 50° C. to 700° C., such as from 50° C. to 100° C., from 100° C. to 150° C., from 150° C. to 200° C., from 200° C. to 250° C., from 250° C. to 300° C., from 300° C. to 350° C., from 350° C. to 400° C., from 400° C. to 450° C., from 450° C. to 500° C., from 500° C. to 550° C., from 550° C. to 600° C., from 600° C. to 650° C., from 650° C. to 700° C., from 200° C. to 400° C., or any combination of these ranges. The hydrotreater 120 may be operated at a pressure of from 10 bar to 300 bar, such as from 10 bar to 250 bar, from 10 bar to 200 bar, from 10 bar to 150 bar, from 15 bar to 300 bar, from 15 bar to 200 bar, from 15 bar to 150 bar, or any subset thereof. The hydrotreater 120 may be operated at a liquid hourly space velocity (LHSV) of from $0.5 \ h^{-1}$ to $5 \ h^{-1}$, such as from $0.5 \ h^{-1}$ to $1 \ h^{-1}$, from $1 \ h^{-1}$ to $2 \ h^{-1}$, from $2 \ h^{-1}$ to $3 \ h^{-1}$, from $3 \ h^{-1}$ to $4 \ h^{-1}$, from $4 \ h^{-1}$ to $5 \ h^{-1}$, or any combination of these ranges.

Still referring to FIG. 1, hydrotreater 120 may produce hydrotreated effluent stream 122, which may then be passed to separation unit 130. Separation unit 130 may separate hydrotreated effluent stream 122 into separation unit effluent stream 132 and naphthenic stream 134. According to one or more embodiments, the hydrotreated effluent stream 122 may comprise the hydrotreated C9+ compounds (products of the C9+ aromatic compounds) and hydrotreated naphtha. As the C9+ aromatics were hydrogenated in the hydrotreater 120, the hydrotreated effluent stream 122 may have a greater ratio of hydrogen to carbon than the combination of the C9+ aromatic compounds containing stream 110 and the heavy naphtha stream 102 that was subjected to the hydrotreatment in the hydrotreater 120. Thus, hydrogen atoms from the input hydrogen-containing stream 104 are incorporated into the hydrocarbons in the hydrotreated effluent stream 122 in form of cyclo-hexane moieties. For example, the degree of saturation of the hydrocarbons in the hydrotreated effluent stream 122 may be higher than the degree of saturation in the combination of C9+ aromatic compounds containing streams 110 and heavy naphtha stream 102. The hydrotreated effluent stream 122 may comprise less than 1 wt. %, such as less than 0.5 wt. %, less than 0.1 wt. %, less than 0.01 wt. %, or even less than 0.001 wt. % of the combined weight of sulfur and nitrogen.

As described herein, in some embodiments a separation unit 130 may separate the hydrotreated effluent stream 122 into separation unit effluent stream 132 and naphthenic stream 134. The separation unit 130 may be any separation unit capable of removing a naphthenic stream 134 from the hydrotreated effluent stream 122. In some embodiments, the separation unit 130 may be an extractive separation unit or a membrane separation unit. In an extractive separation unit, a liquid-liquid extraction is performed to remove one or more compounds (such as aromatic compounds) from the bulk feedstock into a solvent. The solvent may then be separated in any suitable separation unit, such as, and without limitation, a series of flash vessels or a fractionator/distillation column that separates feedstock based on the boiling point, to remove the separated compounds. Generally, in a membrane separation unit, a polar solvent is separated from the bulk feedstock by a membrane to remove one or more compounds from the bulk feedstock into the polar solvent. The solvent and the remaining feedstock may then be separated in any suitable separation unit, such as, and without limitation, a series of flash vessels or a fractionator/distillation column that separates feedstock based on the boiling point, to remove the target compounds. The separation unit 130 may include any suitable separation unit, such as, and without limitation, a series of flash vessels or a fractionator/distillation column that separates feedstock based on the boiling point.

According to one or more embodiments, the separation unit effluent stream 132 may comprise aromatic hydrocarbons, and acyclic hydrocarbons (i.e., hydrocarbons that do not include an alkane ring structure, such as linear or branched hydrocarbons void of cyclo-hexane moieties). In general, the separation unit effluent stream 132 may be similar to or identical hydrotreated naphtha, which may be later processed by a reformer and utilized for gasoline blend. In embodiments, the separation unit effluent stream 132 may comprise at least 50 wt. %, at least 60 wt. %, at least 70 wt. %, at least 80 wt. %, at least 90 wt. %, or at least 95 wt. % of aromatic hydrocarbons and acyclic hydrocarbons, on the basis of the total weight of separation unit effluent stream 132.

According to one or more embodiments, the naphthenic stream 134 may comprise non-aromatic cyclic hydrocarbons (i.e., hydrocarbons that include a cyclo-hexane moiety). In some embodiments, the non-aromatic cyclic hydrocarbons of naphthenic stream 134 may be saturated cyclic hydrocarbons. In embodiments, the non-aromatic cyclic hydrocarbons of naphthenic stream 134 may be non-aromatic C9+ cyclic hydrocarbons, such as saturated cyclic C9+ hydrocarbons. In embodiments, naphthenic stream 134 may comprise at least 50 wt. %, at least 60 wt. %, at least 70 wt. %, at least 80 wt. %, at least 90 wt. %, or at least 95 wt. % of non-aromatic cyclic hydrocarbons, on the basis of the total weight of the naphthenic stream 134.

Still referring to FIG. 1, the naphthenic stream 134, or a portion thereof, may be transported from the first hydrocarbon processing facility 100 to the second hydrocarbon processing facility 200. Transporting may refer to the process of physically moving hydrocarbons, and to the process of preparing the hydrocarbons to be physically moved, from the first hydrocarbon processing facility 100 to the second hydrocarbon processing facility 200, and to the storage of hydrocarbons before, during, or after physical movement of the hydrocarbons. Where hydrogen is transported, as described herein, the hydrogen may be transported in the form of hydrogen atoms covalently bonded to hydrocarbon molecules. In embodiments, transporting the naphthenic stream 134, or a portion thereof, may comprise transporting the naphthenic stream 134, or a portion thereof, from the first hydrocarbon processing facility 100 to the second hydrocarbon processing facility 200 by tanker truck, train, ship, pipeline, or the like. In embodiments, the hydrocarbons may be transported from the first hydrocarbon processing facility 100 to the second hydrocarbon processing facility 200 by tanker truck, train, and/or ship. The transportation process may utilize pre-existing crude oil and petroleum products transportation infrastructure. A time of at least 2 weeks, such as at least 1 month, at least 2 months, or at least 6 months, may pass between hydrotreating the heavy naphtha stream 102 and dehydrogenating the naphthenic stream 134. The transportation step may include storing the hydrocarbons at the first hydrocarbon processing facility 100, the second hydrocarbon processing facility 200, at an intermediate storage or processing facility, or in the transportation vessel itself. The temporal difference between the hydrocracking and dehydrogenating steps may allow the operator to store intermittent electricity in the form of hydrogen for use during times of higher demand, such as storing summer solar power for winter.

Still referring to FIG. 1, the naphthenic stream 134, or a portion thereof, may be passed to a dehydrogenation unit 210 to form hydrogen product stream 212 and dehydrogenated hydrocarbon stream 214. The dehydrogenation unit 210 may be any refinery process unit operable to remove hydrogen atoms from a hydrogen molecule to form hydrogen gas. The dehydrogenation unit 210 may be a pre-existing process unit located at an oil refinery. Suitable refinery process units for use as dehydrogenation unit 210 include, for example, steam crackers, catalytic reformers, catalytic crackers, gasification, and aromatization units, and the like. The dehydrogenation unit 210 may be a catalytic reformer. Catalytic reforming may refer to the process of converting linear hydrocarbons (paraffins) into branched alkanes (isoparaffins) and cyclic naphthenes, which are then partially dehydrogenated to produce aromatic hydrocarbons. The dehydrogenation may also produce significant amounts of hydrogen gas. The catalytic reformer may contact the hydrocarbons with a catalyst, the catalyst may be a mono- or bi-functional metal catalyst (for instance, one or more of platinum, palladium, rhenium, tin, gallium, bismuth, or other metal catalysts), a halogen containing catalyst, a catalyst employing a zeolite such as zeolite L or a ZSM-5 zeolite, a catalyst employing a crystalline or amorphous support that is mesoporous or microporous (for instance, an alumina, silica, or alumina silica support), or another type of catalyst that can maximize aromatics production. The catalytic reformer may operate at a reaction temperature of from 50° C. to 700° C., such as from 50° C. to 100° C., from 100° C. to 150° C., from 150° C. to 200° C., from 200° C. to 250° C., from 250° C. to 300° C., from 300° C. to 350° C., from 350° C. to 400° C., from 400° C. to 450° C., from 450° C. to 500° C., from 500° C. to 550° C., from 550° C. to 600° C., from 600° C. to 650° C., from 650° C. to 700° C., from 400° C. to 600° C., or any combination of these ranges; a reaction pressure of from 1 bar to 50 bar, such as from 1 bar to 5 bar, from 5 bar to 10 bar, from 10 bar to 20 bar, from 20 bar to 30 bar, from 30 bar to 40 bar, from 40 bar to 50 bar, or any combination of these ranges; and a liquid hourly space velocity (LHSV) of from $0.5 \text{ h}^{-1}$ to $5 \text{ h}^{-1}$, such as from $0.5 \text{ h}^{-1}$ to $1 \text{ h}^{-1}$, from $1 \text{ h}^{-1}$ to $2 \text{ h}^{-1}$, from $2 \text{ h}^{-1}$ to $3 \text{ h}^{-1}$, from $3 \text{ h}^{-1}$ to $4 \text{ h}^{-1}$, from $4 \text{ h}^{-1}$ to $5 \text{ h}^{-1}$, or any combination of these ranges.

In embodiments, dehydrogenated hydrocarbon stream 214 may comprise hydrocarbons and have a lower hydrogen to carbon ratio than naphthenic stream 134. For example, the dehydrogenated hydrocarbon stream 214 may have a lower degree of saturation than naphthenic stream 134. In embodiments, dehydrogenated hydrocarbon stream 214 may comprise at least 50 wt. %, at least 60 wt. %, at least 70 wt. %, at least 80 wt. %, at least 90 wt. %, at least 95 wt. %, or at least 99 wt. % of aromatic compounds, such as C9+ aromatic compounds. Without being limited by theory, it is believed that when the dehydrogenation reaction produces aromatic compounds, the hydrogen produced may be purer (lower concentrations of carbon monoxide) than when the dehydrogenation reaction produces non-aromatic compounds (such as acyclic compounds). This purity is believed to be due to decreased cracking of the hydrocarbon feeds and decreased CO formation when the end product is an aromatic compound. In embodiments, the dehydrogenated hydrocarbon stream 214 may comprise non-aromatic hydrocarbon compounds, C9+ aromatic compounds, and C9-aromatic compounds.

In embodiments, hydrogen product stream 212 may comprise hydrogen gas, such as at least 80 wt. %, at least 90 wt. %, at least 99 wt. %, at least 99.9 wt. %, at least 99.99 wt. %, or 99.999 wt. % of hydrogen gas, on the basis of the total weight of the hydrogen product stream 212. The hydrogen product stream 212 may comprise less than 500 parts per million by weight (ppm), less than 250 ppm, less than 100 ppm, less than 50 ppm, less than 20 ppm, or less than 10 ppm, less than 5 ppm, less than 2.5 ppm, or less than 1 ppm of each of sulfur and carbon monoxide. One practical and growing application for hydrogen gas is for use in fuel cells. Generally, low temperature fuel cells use precious metal catalysts which are susceptible to poisoning by sulfur and CO in their hydrogen fuels. Thus, it may be desirable for the hydrogen product stream 212 to contain relatively low amounts of sulfur and CO.

Still referring to FIG. 1, a second facility hydrotreated naphtha stream 202 may be passed to the dehydrogenation unit 210, in combination with the naphthenic stream 134. The use of second facility hydrotreated naphtha stream 202 may enable the use of pre-existing dehydrogenation units 210 at hydrocarbon processing facilities, such as oil refineries, which are already dehydrogenating hydrotreated naphtha streams. The second facility hydrotreated naphtha stream 202 may comprise hydrotreated naphtha, such as hydrotreated heavy naphtha. The second facility hydrotreated naphtha stream 202 may have an initial boiling point (IBP) of from 80° C. to 85° C., such as from 85° C. to 90° C., from 90° C. to 95° C., from 95° C. to 100° C., from 88° C. to 92° C., or any combination of these ranges. The second facility hydrotreated naphtha stream 202 may have a final boiling point (FBP) of from 180° C. to 220° C., such as from 190° C. to 220° C., from 200° C. to 220° C., from 210° C. to 220° C., from 195° C. to 205° C., or any combination of these ranges. The second facility hydrotreated naphtha stream 202 may comprise hydrocarbons. Generally, combining the second facility hydrotreated naphtha stream 202 with the naphthenic stream 134 in the dehydrogenation unit 210 may allow existing process facilities which dehydrogenate the second facility hydrotreated naphtha stream 202 to also dehydrogenate naphthenic stream 134, thus lowering capital and operational costs.

Referring now to FIG. 2, another hydrogen transport system 201 is depicted. The hydrogen transport system 201 may be similar or identical to the hydrogen transport system 101 of FIG. 1, except where described otherwise. In particular, the hydrogen transport system 201 may form C9+ aromatic compounds containing stream 110 from separation unit effluent stream 132, utilizing an aromatics complex 300 as described herein. In some embodiments, hydrogen transport system 201 may form C9+ aromatic compounds containing stream 110 from separation unit effluent stream 132 using pre-existing oil refinery process equipment. As depicted in FIG. 2 the hydrogen transport system 201 may pass separation unit effluent stream 132 to catalytic reformer 140 and on to aromatics complex 300 to produce C9+ aromatic compounds containing stream 110, which may then be recycled back to hydrotreater 120.

According to some embodiments, separation unit effluent stream 132 may be passed to catalytic reformer 140 to form reformate stream 142. The catalytic reformer 140 may be a catalytic reformer in a pre-existing oil refinery. The catalytic reformer 140 may produce byproduct hydrogen gas (not shown in the figure) which may be recycled back to hydrotreater 120 as part of input hydrogen-containing stream 104. The catalytic reformer 140 may include a catalyst that is compatible with catalytic processes that maximize production of aromatics. For instance, the catalyst can be a mono- or bi-functional metal catalyst (for instance, one or more of platinum, palladium, rhenium, tin, gallium, bismuth, or other metal catalysts), a halogen containing catalyst, a catalyst employing a zeolite such as zeolite L or a ZSM-5 zeolite, a catalyst employing a crystalline or amorphous support that is mesoporous or microporous (for instance, an alumina, silica, or alumina silica support), or another type of catalyst that can maximize aromatics production. The operating conditions of the catalytic reformer 140 may be selected to maximize aromatics production. The catalytic reformer 140 may operate at a pressure from 0.01 bar to 50 bar, such as from 0.1 bar to 1 bar, from 1 bar to 5 bar, from 5 bar to 10 bar, from 10 bar to 20 bar, from 20 bar to 30 bar, from 30 bar to 40 bar, from 40 bar to 50 bar, or any combination of these ranges. The molar ratio of hydrogen to hydrocarbon in the catalytic reformer 140 may be from 1:1 to 10:1, such as from 1:1 to 8:1, from 1:1 to 6:1, from 1:1 to 4:1, from 1:1 to 2:1, from 2:1 to 10:1, from 4:1 to 10:1, from 6:1 to 10:1, from 8:1 to 10:1, or any combination of these ranges. The catalytic reformer 140 may operate at a temperature from 50° C. to 700° C., such as from 50° C. to 100° C., from 100° C. to 200° C., from 200° C. to 300° C., from 300° C. to 400° C., from 400° C. to 500° C., from 500° C. to 600° C., from 600° C. to 700° C., from 400° C. to 600° C., or any combination of these ranges. The catalytic reformer 140 may operate with a liquid hour space velocity of from $0.1 \ h^{-1}$ to $5 \ h^{-1}$, such as from $0.1 \ h^{-1}$ to $1 \ h^{-1}$, from $1 \ h^{-1}$ to $2 \ h^{-1}$, from $2 \ h^{-1}$ to $3 \ h^{-1}$, from $3 \ h^{-1}$ to $4 \ h^{-1}$, from $4 \ h^{-1}$ to $5 \ h^{-1}$, or any combination of these ranges.

According to some embodiments, reformate stream 142 may comprise a mixture of linear hydrocarbons (paraffins), branched alkanes (isoparaffins), and saturated cyclic compounds, and aromatic compounds.

Still referring to FIG. 2, the reformate stream 142 may then be passed to extraction unit 150 to form aromatic stream 152. Extraction unit 150 may be any separation unit or group of units capable of separating aromatic compounds from non-aromatic compounds. In embodiments, the extraction unit 150 may be an extractive separation unit. In addition to aromatic stream 152, a non-aromatic stream (not shown in the figure) may be formed by extraction unit 150. The non-aromatic stream formed by extraction unit 150 may comprise the non-aromatic compounds originally in reformate stream 142. The non-aromatic stream formed by extraction unit 150, or portions thereof, may be recycled to the hydrotreater 120, the catalytic reformer 140, sold as product, burned, or used as feed to other processes.

According to some embodiments, aromatic stream 152 may comprise aromatic hydrocarbons. In embodiments, aromatic stream 152 may comprise at least 50 wt. %, at least 60 wt. %, at least 70 wt. %, at least 80 wt. %, at least 90 wt. %, at least 95 wt. %, or at least 99 wt. % of aromatic hydrocarbons, on the basis of the total weight of aromatic stream 152. In some embodiments, the extraction unit 150 may utilize a solvent. In such embodiments, the solvent may need to be removed from the aromatic stream 152 in a further solvent separation unit (not shown in the figures). Before the solvent is removed from the aromatic stream 152, the aromatic stream 152 may comprise at least 50 wt. %, at least 60 wt. %, at least 70 wt. %, at least 80 wt. %, at least 90 wt. %, at least 95 wt. %, or at least 99 wt. % of the combined weight of solvent and aromatic hydrocarbons, on the basis of the total weight of aromatic stream 152

Still referring to FIG. 2, aromatic stream 152 may then be passed to aromatics complex 300 to form benzene stream 312, toluene stream 322, mixed xylenes stream 332, and C9+ aromatic compounds containing stream 110. In some embodiments, benzene stream 312, toluene stream 322, and mixed xylenes stream 332 may form a combined benzene-toluene-xylene (BTX) stream (not shown in the figures). As stated herein, the C9+ aromatic compounds containing stream 110 may be recycled back to hydrotreater 120 to form at least a portion of the feed to the hydrotreater 120.

In some embodiments, benzene stream 312 may comprise benzene. In embodiments, benzene stream 312 may comprise at least 80 wt. %, at least 90 wt. %, at least 95 wt. %, or at least 99 wt. % of benzene, on the basis of the total weight of benzene stream 312. In some embodiments, toluene stream 322 may comprise toluene. In embodiments, toluene stream 322 may comprise at least 80 wt. %, at least 90 wt. %, at least 95 wt. %, or at least 99 wt. % of toluene, on the basis of the total weight of toluene stream 322. In some embodiments, mixed xylenes stream 332 may comprise mixtures of xylenes. In embodiments, mixed xylenes stream 332 may comprise at least 80 wt. %, at least 90 wt. %, at least 95 wt. %, or at least 99 wt. % of xylenes, on the basis of the total weight of mixed xylenes stream 332.

Referring now to FIG. 3, the aromatics complex 300 of FIG. 2 is depicted in greater detail. The aromatics complex 300 may be an aromatics complex at a pre-existing oil refinery. In the aromatics complex 300, aromatic compounds, such as benzene, toluene, xylenes, and C9+ aromatic compounds may be separated from one another. In the aromatics complex 300, the aromatic stream 152 may be passed to clay treater 340 to produce clay treated stream 342. The clay treater 340 may operate to purify the aromatic stream 152. In embodiments, the clay treater 340 may function to remove at least non-aromatic olefin compounds from aromatic stream 152 by reacting the non-aromatic olefin compounds by acid catalyzed alkylation. Generally, these non-aromatic olefin compounds may poison downstream units (such as p-xylene extraction units) or may reduce the purity of the product aromatic streams (benzene stream 312, toluene stream 322, and mixed xylenes stream 332). The clay treater 340 may function by contacting the aromatic stream 152 with a Lewis acid catalyst, such as an activated clay. The clay treater 340 may contact aromatic stream 152 with the Lewis acid catalyst at temperatures of greater than 165° C., such as greater than 170° C., greater than 180° C., from 165° C. to 250° C., from 170° C. to 230° C., from 180° C. to 220° C., from 190° C. to 210° C., or any subset thereof.

According to some embodiments, the clay treated stream 342 may comprise benzene, toluene, xylenes, and C9+ aromatic compounds. In embodiments, the clay treated stream 342 may have a lower concentration of benzene and higher concentrations of toluene and xylenes than aromatic stream 152. In embodiments, the clay treated stream 342 may comprise at least 60 wt. %, at least 70 wt. %, at least 80 wt. %, at least 90 wt. %, at least 95 wt. %, or at least 99 wt. % of the combined weight of benzene, toluene, xylenes, and C9+ aromatic compounds, on the basis of the total weight of clay treated stream 342. In some embodiments, the clay treated stream 342 may comprise less than 5 wt. %, such as less than 2.5 wt. %, less than 1 wt. %, less than 0.5 wt. %, less than 0.25 wt. %, less than 0.1 wt. %, less than 0.01 wt. %, or even less than 0.001 wt. % of olefinic non-aromatic hydrocarbons, on the basis of the total weight of 342.

Still referring to FIG. 3, clay treated stream 342 may be passed to benzene extraction unit 310 to form benzene stream 312 and de-benzened stream 314. Benzene extraction unit 310 may be a process unit or group of process units capable of separating benzene from other aromatic hydrocarbons. In some embodiments, the benzene extraction unit 310 may be any suitable separation unit, such as, and without limitation, a flash vessel that separates feedstock based on the boiling point. In embodiments, de-benzened stream 314 may comprise toluene, xylene, and C9+ aromatic compounds. In embodiments, de-benzened stream 314 may comprise at least 80 wt. %, at least 90 wt. %, at least 95 wt. %, or at least 99 wt. % of the combined weight of toluene, xylenes, and C9+ aromatic compounds, on the basis of the total weight of de-benzened stream 314.

According to some embodiments, de-benzened stream 314 may be passed to toluene extraction unit 320 to form toluene stream 322 and de-toluened stream 324. Toluene extraction unit 320 may be a process unit or group of process units capable of separating toluene from other aromatic hydrocarbons. In some embodiments, the toluene extraction unit 320 may be any suitable separation unit, such as, and without limitation, a flash vessel that separates feedstock based on the boiling point. In embodiments, de-toluened stream 324 may comprise xylene, and C9+ aromatic compounds. In embodiments, de-toluened stream 324 may comprise at least 80 wt. %, at least 90 wt. %, at least 95 wt. %, or at least 99 wt. % of the combined weight of xylenes and C9+ aromatic compounds, on the basis of the total weight of de-toluened stream 324.

According to some embodiments, de-toluened stream 324 may be passed to xylene extraction unit 330 to form mixed xylenes stream 332 and C9+ aromatic compounds containing stream 110. Xylene extraction unit 330 may be a process unit or group of process units capable of separating xylene from other aromatic hydrocarbons. In some embodiments, the xylene extraction unit 330 may be any suitable separation unit, such as, and without limitation, a flash vessel that separates feedstock based on the boiling point.

Referring again to FIGS. 1 and 2, as mentioned previously, in some embodiments, the input hydrogen-containing stream 104 may comprise hydrogen produced from hydrocarbons, hydrogen produced from renewable sources (e.g., hydrogen produced from water electrolysis using electricity produced from sources other than the combustion of hydrocarbons), or both. In some embodiments, the input hydrogen-containing stream 104 may be a combination of both hydrogen produced from hydrocarbons and hydrogen produced from renewable sources. For example, the electricity for the electrolysis process may be produced from solar power, wind power, geothermal power, or hydroelectric power. In some embodiments, where both renewable hydrogen and hydrogen produced from hydrocarbons are present, the amount of renewable hydrogen introduced to the hydrotreater 120 may be greater than or equal to the amount of hydrogen released through the dehydrogenation reactions, per ton of hydrocarbon feed. For example, if the total hydrogen released through the dehydrogenation reactions is 1 kg hydrogen/10 kg hydrocarbon feed, then at least 1 kg of renewable hydrogen per 10 kg hydrocarbon feed may be introduced to the hydrotreater 120. In embodiments, at least 10 wt. % of the hydrogen introduced to the hydrotreater 120 may be produced from the combustion of hydrocarbons. Generally, when the of amount of renewable hydrogen introduced to the hydrotreater 120 is greater than or equal to the amount of hydrogen released through the dehydrogenation reactions, it may be possible for sellers to market the hydrogen released through the dehydrogenation reactions as renewable hydrogen. However, renewable hydrogen may be more expensive than hydrogen produced from hydrocarbons, and thus it may be desirable to minimize the amount of renewable hydrogen utilized. The use of a combination of hydrogen produced from hydrocarbons and hydrogen produced from renewable sources may enable to sellers to market the hydrogen released as renewable hydrogen while still utilizing at least some of the generally less expensive hydrogen produced from hydrocarbons.

Numerous aspects are included in the present disclosure.

Aspect 1. A method for transporting hydrogen, the method comprising: at a first hydrocarbon processing facility: passing a heavy naphtha stream, a C9+ aromatic compounds-containing stream, and an input hydrogen-containing stream to a hydrotreater to form a hydrotreated effluent stream, wherein: the heavy naphtha stream has an initial boiling point of from 80° C. to 100° C. and a final boiling point of from 180° C. to 220° C.; and the hydrotreated effluent stream comprises hydrotreated naphtha and one or more saturated cyclic C9+ compounds; passing the hydrotreated effluent stream to a separation unit to form a naphthenics-containing stream and a separation unit effluent stream, wherein: the naphthenics-containing stream comprises at least 50 wt. % saturated cyclic C9+ compounds; and the separation unit effluent stream comprises at least 50 wt. % of hydrotreated naphtha; transporting the naphthenic stream to a second hydrocarbon processing facility, wherein the first hydrocarbon processing facility and the second hydrocarbon processing facility are separated by a distance of at least 100 km; and at the second hydrocarbon processing facility, passing at least a portion of the naphthenic stream to a dehydrogenation unit to form a dehydrogenated hydrocarbon stream and a hydrogen product stream.

Aspect 2. The method of aspect 1, wherein the dehydrogenation unit is a catalytic reformer.

Aspect 3. The method of aspect 2, further comprising passing a second facility hydrotreated naphtha stream to the dehydrogenation unit, wherein the second facility hydrotreated naphtha stream has an initial boiling point of from 80° C. to 100° C. and a final boiling point of from 180° C. to 220° C.

Aspect 4. The method of any one of aspects 1-3, wherein the heavy naphtha stream has an initial boiling point of from 88° C. to 92° C. and a final boiling point of from 195° C. to 205° C.

Aspect 5. The method of any one of aspects 1-4, wherein the second hydrocarbon processing facility is an oil refinery.

Aspect 6. The method of any one of aspects 1-5, wherein transporting the naphthenic stream comprises moving the naphthenic stream by truck, train, or ship.

Aspect 7. The method of any one of aspects 1-6, further comprising: passing the separation unit effluent stream to a catalytic reformer to form a reformate stream; passing the reformate stream to an extraction unit to form an aromatic stream; passing the aromatic stream to an aromatics complex to form the C9+ aromatic compounds containing stream; and recycling the C9+ aromatic compounds containing stream to the hydrotreater.

Aspect 8. The method of aspect 7, wherein passing the aromatics containing stream to the aromatics complex comprises: passing the aromatics containing stream to a clay treater to form a clay treated stream; passing the clay treated stream to a benzene extraction unit to form a de-benzened stream and a benzene stream; passing the de-benzened stream to a toluene extraction unit to form a de-toluened stream and a toluene stream; and passing the de-toluened stream to a xylene extraction unit to form the C9+ aromatic compounds containing stream and a mixed xylenes stream, such that the C9+ aromatic compounds containing stream is recycled back to the hydrotreater.

Aspect 9. The method of any one of aspects 1-8, the hydrotreater is operated at reaction conditions of from 50° C. to 700° C.; a pressure of from 10 to 300 bar; and a liquid hourly space velocity (LHSV) of from 0.5 h$^{-1}$ to 5 h$^{-1}$.

Aspect 10. The method of any one of aspects 1-9, wherein the naphthenic stream comprises at least 80 wt. % of saturated cyclic C9+ compounds.

Aspect 11. A method for processing hydrogen, the method comprising: passing a heavy naphtha stream, a C9+ aromatic compounds containing stream, and an input hydrogen-containing stream to a hydrotreater to form a hydrotreated effluent stream, wherein: the heavy naphtha stream has an initial boiling point of from 80° C. to 100° C. and a final boiling point of from 180° C. to 220° C.; and the hydrotreated effluent stream comprises hydrotreated naphtha and one or more saturated cyclic C9+ compounds; passing the hydrotreated effluent stream to a separator to form a naphthenic stream and a separation unit effluent stream, wherein: the naphthenic stream comprises at least 50 wt. % saturated cyclic C9+ compounds; and the separation unit effluent stream comprises at least 50 wt. % of hydrotreated naphtha; passing the separation unit effluent stream to a catalytic reformer to form a reformate stream; passing the reformate stream to an aromatics separation unit to form an aromatics containing stream and a non-aromatics containing stream, wherein the aromatics containing stream comprises at least 50 wt. % of aromatic compounds and the non-aromatics containing stream comprises at least 50 wt. % of non-aromatic compounds; passing the aromatics containing stream to an aromatics complex to form the C9+ aromatic compounds containing stream; and recycling the C9+ aromatic compounds containing stream to the hydrotreater.

Aspect 12. The method of aspect 11, wherein the hydrotreater, the separation unit, the catalytic reformer, the aromatics separation unit, and the aromatics complex are positioned within a first hydrocarbon processing facility, the process further comprising: transporting the naphthenic stream to a second hydrocarbon processing facility; and at the second hydrocarbon processing facility, passing the naphthenic stream to a dehydrogenation unit to form a dehydrogenated hydrocarbon stream and a hydrogen product stream, wherein the first hydrocarbon processing facility and the second hydrocarbon processing facility are separated by a distance at least 100 km.

Aspect 13. The method of any one of aspects 11-12, wherein passing the aromatics containing stream to the aromatics complex comprises: passing the aromatics containing stream to a clay treater to form a clay treated stream; passing the clay treated stream to a benzene extraction unit to form a de-benzened stream and a benzene stream; passing the de-benzened stream to a toluene extraction unit to form a de-toluened stream and a toluene stream; and passing the de-toluened stream to a xylene extraction unit to form the C9+ aromatic compounds containing stream and a mixed xylenes stream, such that the C9+ aromatic compounds containing stream is recycled back to the hydrotreater.

Aspect 14. The method of aspect 13, wherein the clay treater contacts the aromatics containing stream with a Lewis acid clay.

Aspect 15. The method of any one of aspects 13-14, wherein the clay treated stream comprises less than 1 wt. % of non-aromatic olefin compounds.

Aspect 16. The method of any one of aspects 11-15, wherein transporting the naphthenic stream comprises moving the naphthenic stream by truck, train, or ship.

Aspect 17. The method of any one of aspects 12-16, wherein the second hydrocarbon processing facility is an oil refinery.

Aspect 18. The method of any one of aspects 11-17, wherein the naphthenic stream comprises at least 80 wt. % of saturated cyclic C9+ compounds.

Aspect 19. The method of any one of aspects 11-18, wherein the hydrotreater is operated at reaction conditions of from 50° C. to 700° C., a pressure of from 10 to 300 bar, and a liquid hourly space velocity of from 0.5 h$^{-1}$ to 5 h$^{-1}$.

Aspect 20. The method of any one of aspects 11-19, wherein the separation unit is an extractive separation unit.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream). It should also be understood that components of a stream are disclosed as passing from one system component to another when a stream comprising that component is disclosed as passing from that system component to another. For example, a disclosed "hydrotreated effluent stream" passing from a first system component to a second system component should be understood to equivalently disclose "propylene" passing from a first system component to a second system component, and the like.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

It is also noted that recitations herein of "at least one" component, element, etc., should not be used to create an inference that the alternative use of the articles "a" or "an" should be limited to a single component, element, etc.

What is claimed is:

1. A method for transporting hydrogen, the method comprising:

at a first hydrocarbon processing facility:
passing a heavy naphtha stream, a C9+ aromatic compounds-containing stream comprising at least 60 wt. % C9+ aromatic compounds, and an input hydrogen-containing stream to a hydrotreater to form a hydrotreated effluent stream, wherein:
the heavy naphtha stream has an initial boiling point of from 80° C. to 100° C. and a final boiling point of from 180° C. to 220° C.; and
the hydrotreated effluent stream comprises hydrotreated naphtha and one or more saturated cyclic C9+ compounds;
passing the hydrotreated effluent stream to a separation unit to form a naphthenics-containing stream and a separation unit effluent stream, wherein:
the naphthenics-containing stream comprises at least 50 wt. % saturated cyclic C9+ compounds; and
the separation unit effluent stream comprises at least 50 wt. % of hydrotreated naphtha;
transporting the naphthenics-containing stream to a second hydrocarbon processing facility, wherein the first hydrocarbon processing facility and the second hydrocarbon processing facility are separated by a distance of at least 100 km; and
at the second hydrocarbon processing facility, passing at least a portion of the naphthenics-containing stream to a dehydrogenation unit to form a dehydrogenated hydrocarbon stream and a hydrogen product stream.

2. The method of claim 1, wherein the dehydrogenation unit is a catalytic reformer.

3. The method of claim 2, further comprising passing a second facility hydrotreated naphtha stream to the dehydrogenation unit, wherein the second facility hydrotreated naphtha stream has an initial boiling point of from 80° C. to 100° C. and a final boiling point of from 180° C. to 220° C.

4. The method of claim 1, wherein the heavy naphtha stream is a crude oil cut having an initial boiling point of from 88° C. to 92° C. and a final boiling point of from 195° C. to 205° C.

5. The method of claim 1, wherein the second hydrocarbon processing facility is an oil refinery.

6. The method of claim 1, wherein transporting the naphthenic stream comprises moving the naphthenic stream by truck, train, or ship.

7. The method of claim 1, further comprising:
passing the separation unit effluent stream to a catalytic reformer to form a reformate stream;
passing the reformate stream to an extraction unit to form an aromatic stream;
passing the aromatic stream to an aromatics complex to form the C9+ aromatic compounds containing stream; and
recycling the C9+ aromatic compounds containing stream to the hydrotreater.

8. The method of claim 7, wherein passing the aromatics containing stream to the aromatics complex comprises:
passing the aromatics containing stream to a clay treater to form a clay treated stream;
passing the clay treated stream to a benzene extraction unit to form a de-benzened stream and a benzene stream;
passing the de-benzened stream to a toluene extraction unit to form a de-toluened stream and a toluene stream; and
passing the de-toluened stream to a xylene extraction unit to form the C9+ aromatic compounds containing stream and a mixed xylenes stream, such that the C9+ aromatic compounds containing stream is recycled back to the hydrotreater.

9. The method of claim 1, the hydrotreater is operated at reaction conditions of from 50° C. to 700° C.; a pressure of from 10 to 300 bar; and a liquid hourly space velocity (LHSV) of from 0.5 h$^{-1}$ to 5 h$^{-1}$.

10. The method of claim 1, wherein the naphthenic stream comprises at least 80 wt. % of saturated cyclic C9+ compounds.

11. A method for processing hydrogen, the method comprising:
passing a heavy naphtha stream, a C9+ aromatic compounds containing stream comprising at least 60 wt. % C9+ aromatic compounds, and an input hydrogen-containing stream to a hydrotreater to form a hydrotreated effluent stream, wherein:
the heavy naphtha stream has an initial boiling point of from 80° C. to 100° C. and a final boiling point of from 180° C. to 220° C.; and
the hydrotreated effluent stream comprises hydrotreated naphtha and one or more saturated cyclic C9+ compounds;
passing the hydrotreated effluent stream to a separator to form a naphthenic stream and a separation unit effluent stream, wherein:
the naphthenic stream comprises at least 50 wt. % saturated cyclic C9+ compounds; and
the separation unit effluent stream comprises at least 50 wt. % of hydrotreated naphtha;
passing the separation unit effluent stream to a catalytic reformer to form a reformate stream;
passing the reformate stream to an aromatics separation unit to form an aromatics containing stream and a non-aromatics containing stream, wherein the aromatics containing stream comprises at least 50 wt. % of aromatic compounds and the non-aromatics containing stream comprises at least 50 wt. % of non-aromatic compounds;
passing the aromatics containing stream to an aromatics complex to form the C9+ aromatic compounds containing stream; and
recycling the C9+ aromatic compounds containing stream to the hydrotreater.

12. The method of claim 11, wherein the hydrotreater, the separation unit, the catalytic reformer, the aromatics separation unit, and the aromatics complex are positioned within a first hydrocarbon processing facility, the process further comprising:
transporting the naphthenic stream to a second hydrocarbon processing facility; and
at the second hydrocarbon processing facility, passing the naphthenic stream to a dehydrogenation unit to form a dehydrogenated hydrocarbon stream and a hydrogen product stream, wherein the first hydrocarbon processing facility and the second hydrocarbon processing facility are separated by a distance at least 100 km.

13. The method of claim 11, wherein passing the aromatics containing stream to the aromatics complex comprises:

passing the aromatics containing stream to a clay treater to form a clay treated stream;

passing the clay treated stream to a benzene extraction unit to form a de-benzened stream and a benzene stream;

passing the de-benzened stream to a toluene extraction unit to form a de-toluened stream and a toluene stream; and passing the de-toluened stream to a xylene extraction unit to form the C9+ aromatic compounds containing stream and a mixed xylenes stream, such that the C9+ aromatic compounds containing stream is recycled back to the hydrotreater.

14. The method of claim 13, wherein:

the clay treater contacts the aromatics containing stream with a Lewis acid clay; and the clay treated stream comprises less than 1 wt. % of non-aromatic olefin compounds.

15. The method of claim 11, wherein transporting the naphthenic stream comprises moving the naphthenic stream by truck, train, or ship.

16. The method of claim 12, wherein the second hydrocarbon processing facility is an oil refinery.

17. The method of claim 11, wherein the naphthenic stream comprises at least 80 wt. % of saturated cyclic C9+ compounds.

18. The method of claim 11, wherein the hydrotreater is operated at reaction conditions of from 50° C. to 700° C., a pressure of from 10 to 300 bar, and a liquid hourly space velocity of from 0.5 $h^{-1}$ to 5 $h^{-1}$.

19. The method of claim 11, wherein the separation unit comprises is an extractive separation unit.

20. The method of claim 11, wherein the heavy naphtha stream is a crude oil cut.

\* \* \* \* \*